Jan. 28, 1941.  H. SKÅNES  2,230,166
CONTRIVANCE FOR CONCHING CHOCOLATE MASS
Filed July 6, 1938
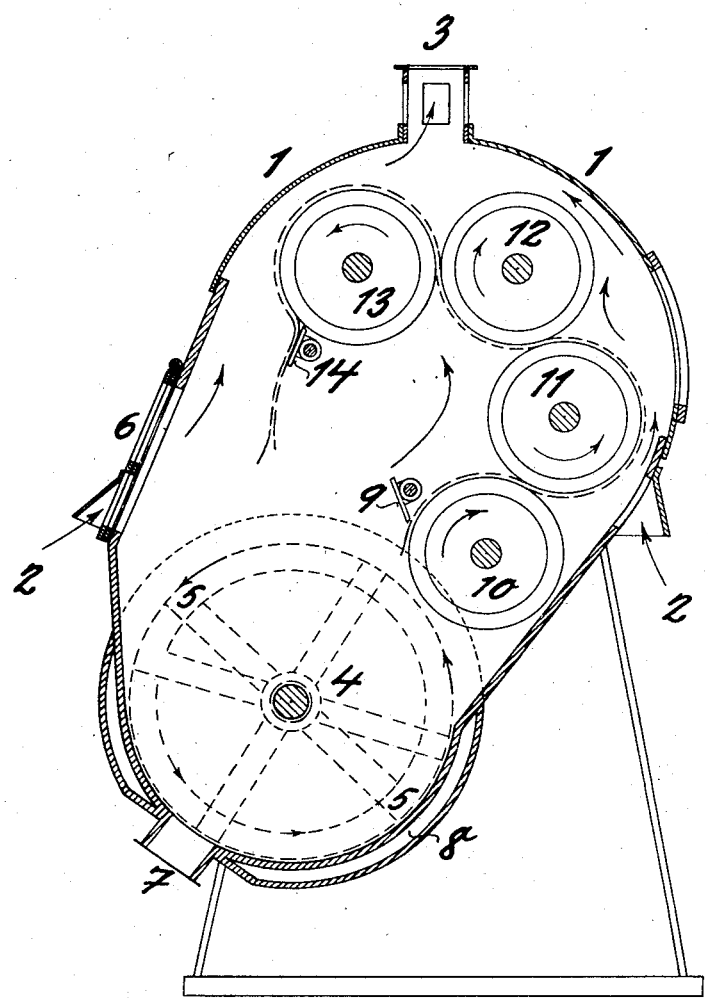
Inventor,
Henry Skånes,
By Frank S. Appleman,
Attorney.

Patented Jan. 28, 1941

2,230,166

UNITED STATES PATENT OFFICE 2,230,166

CONTRIVANCE FOR CONCHING CHOCOLATE MASS

Henry Skanes, Copenhagen, Denmark

Application July 6, 1938, Serial No. 217,825
In Germany March 3, 1937

4 Claims. (Cl. 99—236)

In the manufacture of chocolate the treatment of the chocolate mass in so-called conches is already known, the object of such treatment being to remove from the mass moisture and other undesirable ingredients and at the same time to caramelize the sugar contents by means of heating. In the conches hitherto known the chocolate mass is well agitated by agitators and the suitable form of the conches, by bringing the various parts of the mass to the surface over and over again, thus making it possible to remove the moisture and undesirable ingredients. The processes already known require a considerable length of time and comparatively large machines.

The present invention serves to eliminate these difficulties and consists in connecting up to the conches of any shape and nature previously in use a suitable contrivance which enables the working process to be materially shortened and the same result to be obtained, which, as correspondingly smaller machines can be used, means not only a considerable saving in time, but also in space.

The process forming the subject of this application starts out from a chocolate mass that has already been rolled down to the required degree of fineness, which is spread over drums that serve only the purpose of transporting and do not press one against another, whereby when the mass passes from one drum to the next it is turned over and thus aired, the removal of moisture and the airing of the mass taking place in a constant cycle within the contrivance, without the mass being further crushed by these drums, that serve only for purposes of transportation.

In the annexed drawing by way of an example, one form of the invention is represented in diagrammatic vertical section, and renders the apparatus and process itself easily recognisable. The whole contrivance is enclosed in a casing 1, provided with air inlets 2 and an air outlet 3. Within this casing lies the conche 4 with the mixing vanes 5. The opening through which this conche is filled is shown, for example, at 6, its outlet opening at 7.

The chocolate mass, after being rolled to the required degree of fineness, is placed in the heated conche together with the necessary cacao butter, the conche being heated in the usual manner through a double casing by means of steam or otherwise, for example through the steam jacket 8. In this conche the mass is stirred thoroughly for some time until it appears to be sufficiently treated and is then removed through an opening (not shown) in the region designated by 9, which opening, by means of a damper 9a can be opened or closed from the outside as may be required. The mass then passes to a transport drum 10, which may consist of iron or other suitable material and which can be heated in the usual way by a steam jacket. From the transport drum 10 the mass is taken off to the transport drum 11, from there to the transport drum 12 and then to the transport drum 13, each of these drums travelling quicker than the one preceding it, in order to promote the removal of the mass. The path of travel of the mass is indicated by broken lines 10a, 11a, 12a, and 13a.

The transport drum 10 makes, for instance, 28 R. P. M.

The transport drum 11 makes, for instance, 56 R. P. M.

The transport drum 12 makes, for instance, 90 R. P. M.

The transport drum 13 makes, for instance, 130 R. P. M.

From the transport drum 13 the mass is removed by the scraper 14 and led back to the conche 4 and eventually removed through outlet 7. During the whole process air is drawn into or forced through the contrivance, entering at 2 and leaving at 3, whereby the moisture and undesirable ingredients are constantly carried off, care being taken to have the air circulate more particularly past those parts of the transport drums on which the chocolate mass is travelling, as indicated by the arrows in the drawing. On completion of the process the finished chocolate mass can be drawn off at the opening 7, after having acquired the desired taste, the necessary pastiness and the desired degree of moisture. The agitator, transport drums and the conche itself are provided with steam and water connections for the regulation of the temperature.

The fundamental idea of the invention lies in the spreading of the chocolate mass over as large a surface as possible after the treatment in the conche, in order to facilitate the evaporation of the water and the removal of the undesirable ingredients. Therefore the invention is not tied down to the one special construction shown in the annexed drawing as an example. In the same way, provision is made for the transport drums 10, 11, 12, 13, as well as the conche (4) itself, each to be differently warmed as may be required.

While reference has been made to the use of a gas or air current as alternative agents to be forced against the film, it is to be understood that the term "current" should be construed to mean any agency such as gas or air which will accomplish the result sought.

What we claim is:

1. A conching device for a chocolate mass, comprising a mixing device, a series of transport drums, said drums being arcuately arranged and spaced from each other a sufficient distance to preclude any grinding action, alternate drums in said series rotating in the same direction and the other drums rotating in the opposite direction, the first drum in said series being positioned adjacent said mixing device and adapted to receive said mass therefrom, and the last drum in said series being positioned adjacent said mixing device and adapted to return said mass to said mixing device.

2. A conching device for a chocolate mass, comprising a mixing device, a series of transport drums, said drums being arcuately arranged and spaced from each other a sufficient distance to preclude any grinding action, alternate drums in said series rotating in the same direction and the other drums rotating in the opposite direction, the first drum in said series being positioned adjacent said mixing device and adapted to receive said mass therefrom, and the last drum in said series being positioned adjacent said mixing device and adapted to return said mass to said mixing device, and means for rotating each successive drum in said series at a greater speed than the preceding drum.

3. A device for conching chocolate masses and the like, comprising a conche, an outlet for said mass in a wall of said conche, a cyclic series of transport drums associated with said conche to receive said mass therefrom and return the same thereto, said drums comprising means for spreading the mass out thinly to permit the removal of impurities therefrom and said drums being spaced apart a distance sufficient to preclude any grinding of said mass.

4. In an apparatus for conching chocolate masses and the like having a container for the reception of ready rolled chocolate masses, a plurality of superimposed non-grinding feed drums cooperating with the container, heating means for the said drums, means to spread the mass coming from the container on the outer surface of the drums during the operation, the lowermost drum dipping into the mass from above the container, and the next succeeding drum having means for periodically shifting vertically and laterally, and another drum mounted over the mass container operating to carry the mass from the drums into the starting container, means being also provided for supplying a current over the drum surfaces and against the dropping film of the chocolate mass.

HENRY SKÅNES.